(12) United States Patent
Merrill et al.

(10) Patent No.: US 10,074,915 B2
(45) Date of Patent: Sep. 11, 2018

(54) THROUGH ROOF CONNECTOR ASSEMBLY

(71) Applicant: Thomas & Betts International LLC, Wilmington, DE (US)

(72) Inventors: Antoni Paul Merrill, Ollerton (GB); Martin John Grocock, Nottingham (GB)

(73) Assignee: Thomas & Betts International LLC, Wilmington, DE (US)

( * ) Notice: Subject to any disclaimer, the term of this patent is extended or adjusted under 35 U.S.C. 154(b) by 0 days.

(21) Appl. No.: 15/494,670

(22) Filed: Apr. 24, 2017

(65) Prior Publication Data

US 2017/0317433 A1    Nov. 2, 2017

Related U.S. Application Data

(60) Provisional application No. 62/328,091, filed on Apr. 27, 2016.

(51) Int. Cl.
| | | |
|---|---|---|
| *H01R 4/66* | (2006.01) | |
| *H01B 1/02* | (2006.01) | |
| *H01R 4/30* | (2006.01) | |
| *H01R 4/62* | (2006.01) | |
| *H02G 3/04* | (2006.01) | |
| *H01R 4/44* | (2006.01) | |
| *H01R 4/56* | (2006.01) | |
| *H02G 3/14* | (2006.01) | |

(Continued)

(52) U.S. Cl.
CPC ............. *H01R 4/66* (2013.01); *H01B 1/02* (2013.01); *H01R 4/305* (2013.01); *H01R 4/307* (2013.01); *H01R 4/44* (2013.01); *H01R 4/56* (2013.01); *H01R 4/62* (2013.01); *H02G 3/0406* (2013.01); *H02G 3/14* (2013.01); *H02G 3/22* (2013.01); *H02G 13/80* (2013.01)

(58) Field of Classification Search
CPC .................................................... H01R 4/66
USPC ............................................................ 174/650
See application file for complete search history.

(56) References Cited

U.S. PATENT DOCUMENTS

| | | | | |
|---|---|---|---|---|
| 6,833,704 B1* | 12/2004 | Murphy | ............. | G01R 33/3628 324/318 |
| 2010/0088996 A1* | 4/2010 | Thompson | ............. | F24J 2/5245 52/704 |
| 2012/0187678 A1* | 7/2012 | Williams | ............. | F16L 19/061 285/342 |

OTHER PUBLICATIONS

Erico System 2000 "Lightning Protection Solutions", archived Jul. 24, 2015, https://web.archive.org/web/20150101000000*/https://www.erico.com/catalog/literature/E1147C-WWEN.pdf pp. 11 and 20.*

* cited by examiner

*Primary Examiner* — Hoa C Nguyen
*Assistant Examiner* — Stanley Tso
(74) *Attorney, Agent, or Firm* — Hoffmann & Baron, LLP

(57) ABSTRACT

A through roof connector assembly for connecting an air termination conductor to a conducting rod through a roof of a structure while limiting water ingress into the roof. The through roof connector assembly includes a universal top, a threaded stud, a conduit connection component with an upper threaded tap hole and a lower threaded tap hole which do not meet to provide a completely weatherproof connection, and a conduit extending through a roof membrane when installed in the roof. The conduit has within a conducting rod, the conducting rod threaded the lower threaded tap hole of the conduit connection component. The air terminal also threads into the threaded stud. An o-ring is located between the conduit connection component and the conduit to provide a further weatherproof connection.

13 Claims, 5 Drawing Sheets

(51) Int. Cl.
  *H02G 3/22* (2006.01)
  *H02G 13/00* (2006.01)

*(partial transcription follows)*

THROUGH ROOF CONNECTOR ASSEMBLY

CROSS REFERENCE TO RELATED APPLICATION

This application claims priority to U.S. Provisional Patent Application No. 62/328,091, filed on Apr. 27, 2016, the contents of which are incorporated herein by reference in its entirety.

FIELD OF THE INVENTION

The present invention is generally related to the field of lightning protection system air termination systems. More particularly, the present invention relates to a through roof connector assembly which allows the passage of an air termination conductor through the roof of the structure while maintaining a weathertight seal.

BACKGROUND OF THE INVENTION

Lightning is the sudden electrostatic discharge between electrically charged regions of clouds and strikes either other charged regions of clouds or the ground. It is one of the most substantial hazards presented to mankind by the weather, and if it discharges into a house, tower, or other structure, can cause significant damage including injury, fire, structural damage, or, even in the case of a minor lightning strike, substantial damage to electronic devices. Lightning in an area striking the ground naturally tends towards hitting the highest point, whether it is the roof of a building, a tree, a tower, etc.

Based upon this premise, air terminals (or "lightning rods") and air termination conductor networks may be used to protect a structure from damage. Installation of an air termination conductor through a roof, however, in a similar fashion to installation of any structure which extends through a roof may present problems in terms of maintaining the weatherproofness of the roof.

In view of the foregoing, a need exists for a through roof connector assembly which allows the installation and connection of air termination conductors while maintaining the weatherproof seal of the roof.

SUMMARY

The present invention addresses the above needs in a first embodiment by providing a through roof connector assembly for connecting an air termination conductor to a conducting rod while limiting water ingress through a roof. The through roof connector assembly is capped by a through roof connector. The through roof connector includes a universal top, a threaded stud, and a conduit connection component. The through roof top connector assembly, in addition to the universal top, the threaded stud, and the conduit connection component of the through roof connector, further includes a conduit, a conducting rod, a nut, a washer, and an o-ring, and may further include a roof membrane.

The air termination conductor attaches, via the universal top to the threaded stud. When assembled, the threaded stud extends through the universal top into an upper threaded tap hole of the conduit connection component. The conduit connection component has the upper threaded tap hole and a lower threaded tap hole not meeting through the conduit connection component to assure a weatherproof connection, water having no direct path through the conduit connection component. The threaded stud, after threading through the threaded tap hole, threads into the upper threaded tap hole in order to assemble the through roof top connector assembly. The threaded stud may be one-half inch, one inch, or one and one half inches in length.

The conduit connection component attaches to the conduit extending through the roof membrane and through a roof of a structure, allowing the installation of the through roof connector assembly. The conduit may be constructed of plastic pipe (such as PVC pipe) with a diameter of one-half inch, three-quarter inch, one inch, one and one-quarter inches, one and one-half inches, two inches, and two and one-half inches. When installed, the conduit has within a conducting rod which threads into the lower threaded tap hole of the conduit connection component. The conducting rod as well as the threaded stud, nut, and washer may be composed of stainless steel, copper, or an alloy of copper.

The universal top may be stamped, forged, or cast from an aluminum alloy having a minimum of 90% aluminum or a copper alloy with a minimum of 60% copper. The conduit connection component may be forged or cast from an aluminum alloy with a minimum of 85% aluminum or a copper alloy with a minimum of 80% copper.

An o-ring is located between the conduit connection component and the conduit to provide a further weatherproof connection. The o-ring may be composed of suitable natural or synthetic rubber and have a thickness of 3/16 of an inch, 7/32 of an inch, 1/4 of an inch, 5/16 of an inch, 3/8 of an inch, and 7/16 of an inch.

The present invention addresses the above need in a second embodiment by providing a through roof connector limiting water ingress through a roof, the through roof connector including a universal top, a threaded stud, and a conduit connection component having an upper threaded tap hole and a lower threaded tap hole, the upper threaded tap hole and the lower threaded tap hole not meeting through the conduit connection component. The universal top may have a threaded tap hole through which the threaded stud threads.

BRIEF DESCRIPTION OF THE DRAWINGS

These and other features, aspects, and advantages of the present invention will become better understood with regard to the following detailed description and accompanying drawings where.

DETAILED DESCRIPTION

Figure 1:
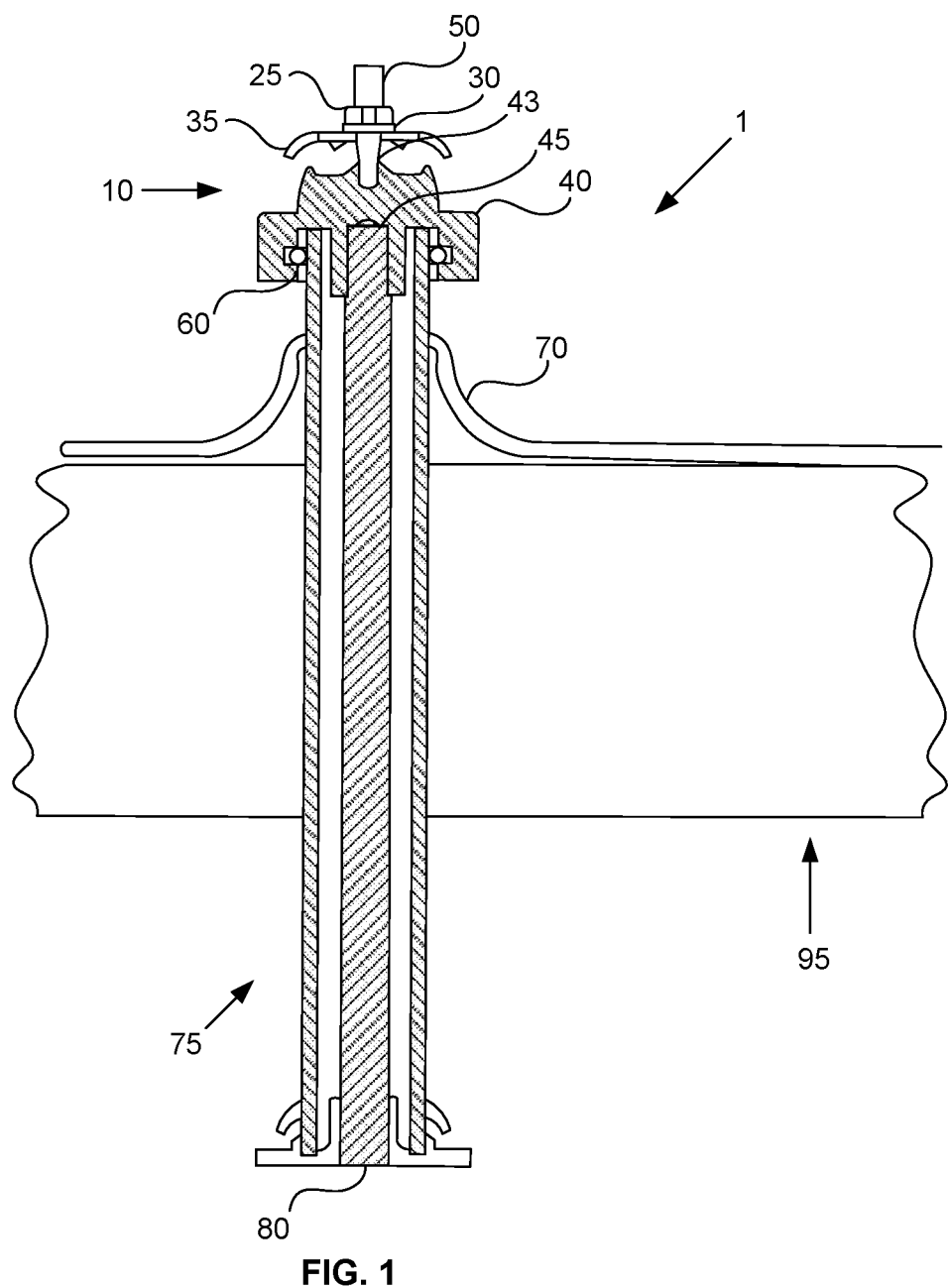
FIG. 1 is a cut-away view of an installed through roof connector assembly.
Figure 2:
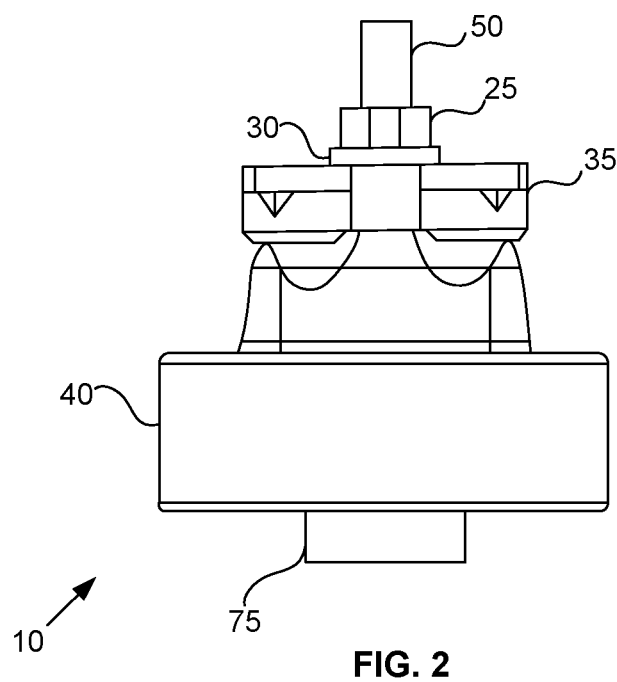
FIG. 2 is an external two-dimensional view of a through roof connector.
Figure 3:
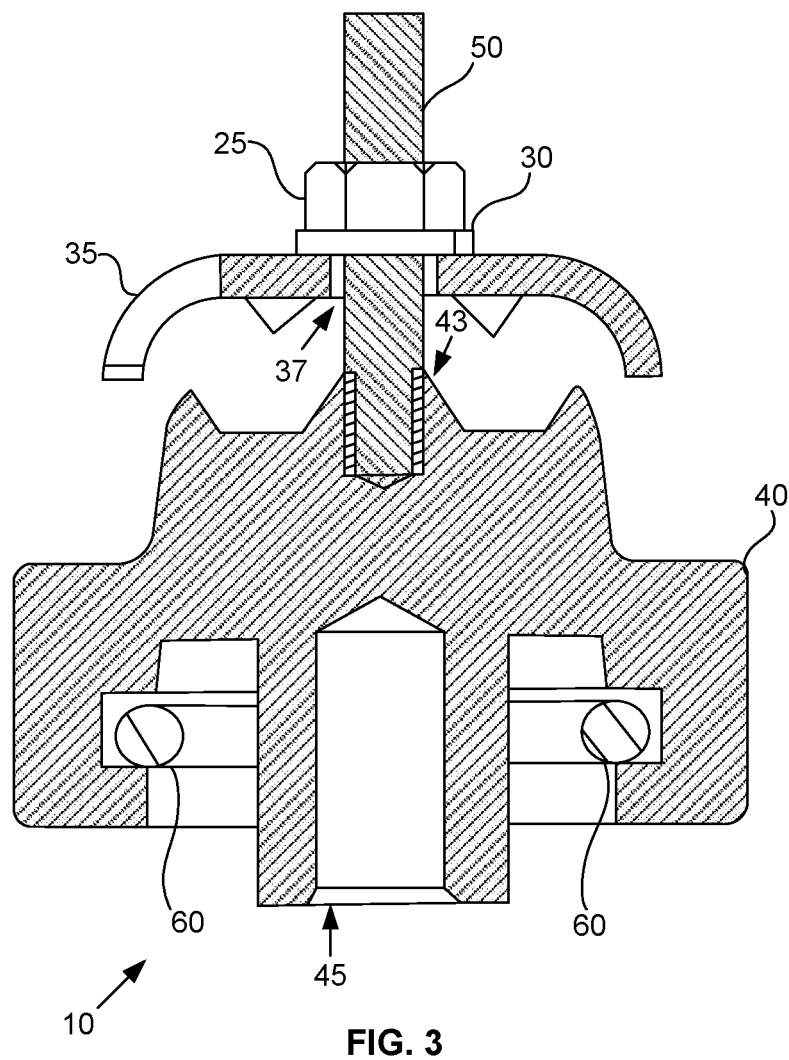
FIG. 3 is a cut-away view of a through roof connector.
Figure 4:
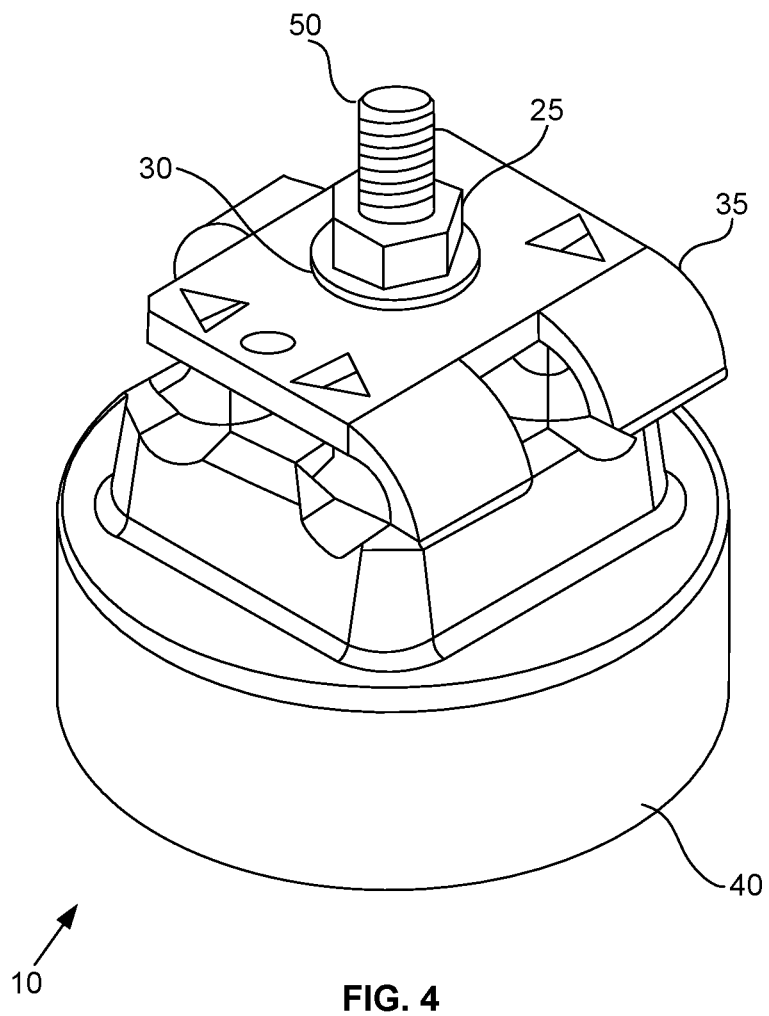
FIG. 4 is an isometric view of a through roof connector.
Figure 5:
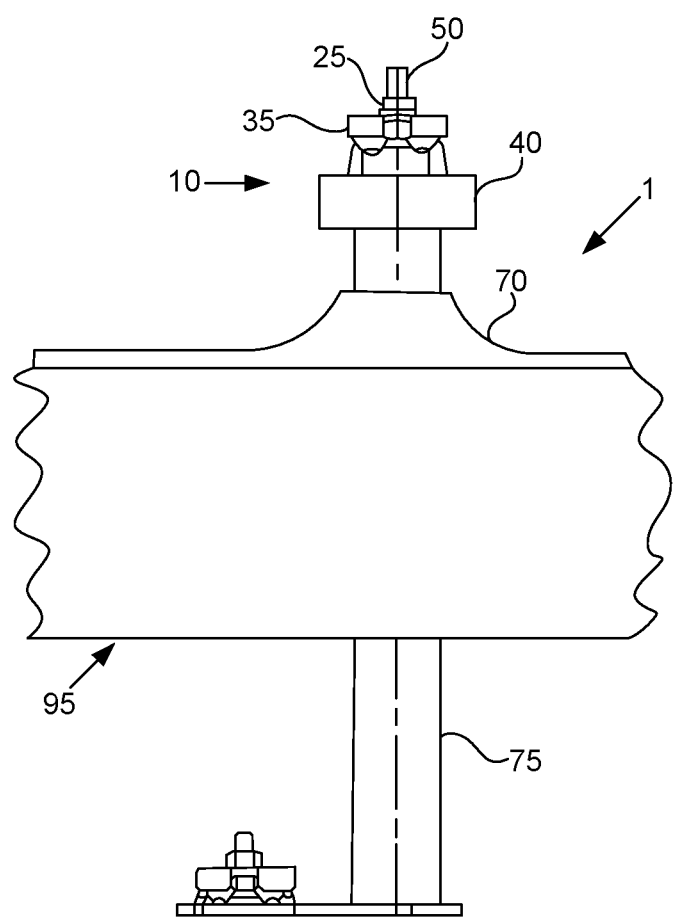
FIG. 5 is an external two-dimensional view of an installed through roof connector assembly.

Referring now to the drawings for a better understanding of the present invention, a through roof connector assembly is indicated in FIG. 1 et seq. by reference numeral 1. The through roof connector assembly 1 is capped by a through roof connector indicated in FIG. 1 et seq. by reference numeral 10. As displayed in FIG. 1 et seq., the through roof connector 10 includes a universal top 35, a threaded stud 50, and a conduit connection component 40. The through roof connector assembly 1, in addition to the universal top 35, threaded stud 50, and conduit connection component 40, also includes a conduit 75, a conducting rod 80, a nut 25, a washer 30, and an o-ring 60, each of which will be described in greater detail hereafter. Also displayed in FIG. 1 et seq. is a roof membrane 70 for maintaining a weatherproof seal around a roof 95. The threaded stud 50 may be one-half inch, one inch, or one and one-half inch in length. The universal top 35 has a roughly central through hole 37 to facilitate attachment to the threaded stud 50. The threaded stud 50 passes through the universal top 35 into an upper threaded tap hole 43 of the conduit connection component 40. In an embodiment of the invention, the roughly central through hole 37 may be threaded to accept threading of the threaded stud 50, and thereby attached the universal top 35. The connection between threaded stud 50 and upper threaded tap hole 43 may be secured with a thread-locking compound such as Loctite® adhesive. The nut 25 (such as a hex nut) and washer 30 (such as a spring washer) may also be used to hold threaded stud 50 in place. The nut 25, washer 30, and threaded stud 50 may be one-quarter inch UNC and may be composed of stainless steel, including 18-8 grade, such as 304 alloy or an alloy of copper.

The conduit connection component 40 has the upper threaded tap hole 43 and a lower threaded tap hole 45. Significantly, the upper threaded tap hole 43 and lower threaded tap hole 45 do not meet through the conduit connection component 40 so as to maintain the weatherproof resistance of the conduit connection component 40. The conduit connection component 40 is therefore solid material and presents at this junction no o-rings, gaskets, or seals to fail, thus maintaining the water tightness of the presently disclosed invention. The conduit 75 attaches to the conduit connection component 40. The conduit may be plastic pipe (such as PVC pipe) with a nominal bore of less than one-half inch, three-quarters inch, one inch, one and one-quarter inches, one and one-half inches, two inches, two and one-half inches, or larger.

The roof membrane 70 is also shown. The conduit 75 extends through the roof membrane 70 and roof 95 of a structure and provides a weatherproof seal between the roof 95, roof membrane 70, and the outside of the conduit 75. The roof membrane 70 may be sealed to the roof 95 via mastic or sealant.

The conduit 75 has within the conducting rod 80 for conducting any lightning which may hit the air terminal 15 via a wire into a grounding wire, grounding spike, etc. The conducting rod 80 is threaded into the lower threaded tap hole 45 of the conduit connection component 40 such as via a one-half inch UNC thread and may be composed of stainless steel and one-half inch in diameter.

The universal top 35, conduit connection component 40, or other parts discussed herein may be stamped from an aluminum alloy with a minimum of 90% aluminum or a copper alloy with a minimum of 60% copper or cast or forged from an aluminum alloy with a minimum of 85% aluminum or a copper alloy with a minimum of 80% copper. Any part made of copper alloy may be tin-plated or not.

In order to further increase the resistance to water of the presently disclosed invention, the conduit connection component 40 also has an o-ring indent for receiving an o-ring 60. The o-ring 60 located between the conduit connection component 40 and the conduit 75. The o-ring 60 may be composed of a suitable natural or synthetic rubber, in an embodiment of the invention. The o-ring 60 may be 3/16, 7/32, 1/4, 5/16, 3/8, or 7/16 of an inch in thickness, or any other standard size. Note also the conduit 75 is recessed into o-ring indent of the conduit connection component 40 to further increase the resistance to water, based upon the usual orientation of the through roof connector 10.

In view of the above, it will be seen that the several objects of the invention are achieved and other advantageous results attained. As various changes could be made in the above constructions without departing from the scope of the invention, it is intended that all matter contained in the above description shall be interpreted as illustrative and not in a limiting sense.

What is claimed is:

1. A through roof connector assembly for connecting an air termination conductor to a conducting rod while limiting water ingress through a roof, the through roof connector assembly comprising:
   a universal top;
   a threaded stud;
   a conduit connection component having an upper threaded tap hole and a lower threaded tap hole, the upper threaded tap hole and lower threaded tap hole not meeting through the conduit connection component;
   a conduit for extending through a roof membrane and a roof of a structure, the conduit having within a conducting rod, the conducting rod being threaded into the lower threaded tap hole of the conduit connection component; and
   an o-ring, the o-ring located between the conduit connection component and the conduit to provide a weatherproof connection.

2. The through roof connector assembly of claim 1, wherein the threaded stud extends through the universal top into the upper threaded tap hole of the conduit connection component.

3. The through roof connector assembly of claim 1, wherein the o-ring is composed of a natural or synthetic rubber.

4. The through roof connector assembly of claim 1, wherein the threaded stud is attached to the universal top via a hex nut and a spring washer.

5. The through roof connector assembly of claim 4, wherein the hex nut and spring washer are composed of stainless steel or an alloy of copper.

6. The through roof connector assembly of claim 1, wherein the conduit is plastic pipe.

7. The through roof connector assembly of claim 1, wherein the conducting rod is made from stainless steel, copper, or a copper alloy.

8. The through roof connector assembly of claim 1, wherein the threaded stud is made from stainless steel.

9. The through roof connector assembly of claim 1, wherein the conduit connection component is cast or forged from an aluminum alloy with a minimum of 85% aluminum or a copper alloy with a minimum of 80% copper.

10. A through roof connector assembly for connecting an air termination conductor to a conducting rod while limiting water ingress through a roof, the through roof connector assembly comprising:
    a universal top;
    a threaded stud;
    a conduit connection component having an upper threaded tap hole and a lower threaded tap hole, the upper threaded tap hole and lower threaded tap hole not meeting through the conduit connection component; and
    a conduit for extending through a roof membrane and a roof of a structure, the conduit having within a conducting rod, the conducting rod being threaded into the lower threaded tap hole of the conduit connection component, wherein the universal top is stamped, cast, or forged from an aluminum alloy having a minimum of 90% aluminum or a copper alloy with a minimum of 60% copper.

11. A through roof connector assembly for connecting an air termination conductor to a conducting rod while limiting water ingress through a roof, the through roof connector assembly comprising:
   a universal top;
   a threaded stud;
   a conduit connection component having an upper threaded tap hole and a lower threaded tap hole, the upper threaded tap hole and lower threaded tap hole not meeting through the conduit connection component;
   a conduit, and
   a conducting rod extending through the conduit, the conducting rod being threaded into the lower threaded tap hole of the conduit connection component, the conduit attached to the conduit connection component and extending through a roof membrane and a roof of a structure such that the conduit completely covers the conducting rod,
   wherein the universal top is stamped, cast, or forged from an aluminum alloy having a minimum of 90% aluminum or a copper alloy with a minimum of 60% copper.

12. The through roof connector assembly of claim 11, further comprising an o-ring, the o-ring located between the conduit connection component and the conduit to provide a weatherproof connection.

13. The through roof connector assembly of claim 11, wherein the threaded stud extends through the universal top into the upper threaded tap hole of the conduit connection component.

* * * * *